(12) United States Patent
Borsarelli et al.

(10) Patent No.: US 8,403,129 B2
(45) Date of Patent: Mar. 26, 2013

(54) METHOD AND TRANSFER ASSEMBLY FOR TRANSFERRING GLASS ARTICLES

(75) Inventors: Gianclaudio Borsarelli, Cuneo (IT); Bruno Viada, Madonna Delle Grazie (IT); Maurizio Barolo, Fossano (IT); Roberto Corradin, Trofarello (IT)

(73) Assignee: Bottero S.p.A., Cuneo (IT)

( * ) Notice: Subject to any disclaimer, the term of this patent is extended or adjusted under 35 U.S.C. 154(b) by 215 days.

(21) Appl. No.: 12/828,796

(22) Filed: Jul. 1, 2010

(65) Prior Publication Data
US 2011/0000765 A1    Jan. 6, 2011

(30) Foreign Application Priority Data
Jul. 3, 2009  (IT) ................ TO2009A0503

(51) Int. Cl.
*B65G 47/52* (2006.01)
(52) U.S. Cl. .......................... 198/723; 65/260
(58) Field of Classification Search ............ 198/723, 198/739, 598; 65/239, 241, 260
See application file for complete search history.

(56) References Cited

U.S. PATENT DOCUMENTS

| | | | | |
|---|---|---|---|---|
| 3,318,433 A | * | 5/1967 | Rowe .................... | 198/468.01 |
| 5,061,309 A | * | 10/1991 | Mungovan et al. ........ | 65/260 |
| 5,429,651 A | * | 7/1995 | Bolin ........................ | 65/241 |
| 6,601,410 B1 | * | 8/2003 | Bogert et al. ............ | 65/260 |
| 7,325,668 B2 | * | 2/2008 | Borsarelli et al. ......... | 198/430 |
| 2005/0193773 A1 | | 9/2005 | Winkelhake et al. | |
| 2009/0257856 A1 | * | 10/2009 | Balbi .......................... | 414/568 |

FOREIGN PATENT DOCUMENTS

| | | |
|---|---|---|
| CZ | 288848 | 9/2001 |
| DE | 19800080 | 3/1999 |
| GB | 1278569 | 6/1976 |
| GB | 2231855 | 11/1990 |
| IT | TO20080278 | 10/2009 |

OTHER PUBLICATIONS

Search Report dated Apr. 27, 2010 corresponding to Italian Patent Application No. IT TO20090503.
European Search Report dated Aug. 31, 2010 for corresponding European Patent Application No. 10168192 consisting of 6 pages.

\* cited by examiner

*Primary Examiner* — Mark A Deuble
(74) *Attorney, Agent, or Firm* — Ohlandt, Greeley, Ruggiero & Perle, L.L.P.

(57) ABSTRACT

An assembly for transferring glass articles, wherein a powered articulated arm is hinged to a fixed support to rotate about a fixed hinge axis, and moves a pusher between an engage position engaging the articles on a supporting surface, and a release position to release the articles onto a linear conveyor; the pusher, in the release position, projects from the articulated arm, in the travelling direction of the articles on the conveyor, beyond a plane containing the fixed hinge axis and perpendicular to the travelling direction of the articles on the conveyor, so that the centre of gravity of the group of articles transferred is located downstream, in the travelling direction of the articles on the conveyor, from the plane containing the fixed hinge axis.

10 Claims, 3 Drawing Sheets

METHOD AND TRANSFER ASSEMBLY FOR TRANSFERRING GLASS ARTICLES

The present invention relates to a method and transfer assembly for transferring glass articles.

BACKGROUND OF THE INVENTION

As is known, once molded, glass articles are extracted from the respective molds, are placed on top of a supporting surface known as a dead plate, and are then transferred onto a linear conveyor, which feeds them in a straight direction to a cooling station.

The glass articles are transferred from the dead plate to the linear conveyor by a transfer assembly, e.g. of the type described in the Applicant's European Patent Applications EP 1627850 B1 and EP 1627859 B1, which comprises a fixed support; a pusher with seats or compartments, for engaging a group of articles for transfer; and an articulated actuating arm connected to the fixed support at one end, and fitted with the pusher at the other.

The articulated arm comprises a powered first elongated portion hinged to the fixed support to rotate about a fixed hinge axis perpendicular to the dead plate; and a powered second elongated portion connected to the first elongated portion to rotate, with respect to the first elongated portion, about a movable hinge axis parallel to the fixed hinge axis.

In known solutions of the above type, when set to an engage position engaging the articles on the dead plate, the pusher projects from the arm, on the opposite side of the arm to the conveyor, and the movable hinge axis extends inside the space between two parallel planes perpendicular to the dead plate and respectively containing the straight travelling direction of the articles on the conveyor, and the fixed hinged axis; and the movable hinge axis remains inside this space as long as it takes to push or transfer the group of articles onto the conveyor.

As a result, when the articles are deposited on the conveyor, the centre of gravity of the group of articles transferred is located upstream, in the travelling direction of the articles on the conveyor, from a plane containing the fixed hinge axis and perpendicular to the travelling direction.

Because of the position of the movable hinge axis when pushing the articles onto the conveyor, and the resulting position of the centre of gravity of the articles on the conveyor, there is a limit to how fast the articles can be transferred, and therefore to how much the output rate can be increased, without damaging the articles and, above all, without some of the articles being left on the dead plate at the push stage, and others being hurled onto the conveyor at the release stage.

In other words, as the output rate and, therefore, the rotation speed of the arm about the fixed hinge axis increase, the articles in the group travel along even widely differing trajectories that get further and further apart radially, as shown in the FIG. 6 diagram, which shows trajectories of a group of three articles to be transferred, and the return trajectories of the articles. As shown in FIG. 6, depending on their locations on the dead plate, the articles travel along different trajectories, with different accelerations and different peripheral speeds, thus resulting, just before the articles are released onto the conveyor, in high speed and acceleration components perpendicular to the travelling direction of the articles on the conveyor.

FIG. 7 shows the speed curves of the articles at the push stage. As can be seen, the speed curves differ widely, but more important is the extent to which the speed of each article oscillates with respect to conveyor speed, especially close to the conveyor.

SUMMARY OF THE INVENTION

It is an object of the present invention to provide a method of transferring glass articles, designed to provide a simple, low-cost solution to the above problems.

According to the present invention, there is provided a method of transferring a group of glass articles from a supporting surface to a conveyor for carrying the group of articles off in a straight horizontal direction; the method comprising the step of rotating an articulated arm, fitted with a pusher for pushing said group of articles, about a fixed hinge axis, so as to move the pusher between an engage position engaging the articles on said supporting surface, and a release position to release the articles onto said conveyor; the method being characterized in that said pusher is moved so that, when the pusher is in the release position, the centre of gravity of said group of articles is located downstream, in the travelling direction of the articles on the conveyor, from a plane containing the fixed hinge axis and perpendicular to said travelling direction.

The present invention also relates to a transfer assembly for transferring glass articles.

According to the present invention, there is provided a transfer assembly for transferring glass articles, the assembly comprising a supporting surface for supporting a group of articles to be transferred; a conveyor for carrying the group of articles off in a straight horizontal direction; a fixed support fixed with respect to said supporting surface; a pusher for removing the articles for transfer; and a powered articulated actuating arm hinged to said fixed support about a fixed hinged axis, to move said pusher between an engage position engaging the articles on said supporting surface, and a release position to release the articles onto said conveyor; the assembly being characterized in that said pusher, in said release position, projects from the arm, in the travelling direction of said conveyor, beyond a plane containing the fixed hinge axis and perpendicular to said travelling direction.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
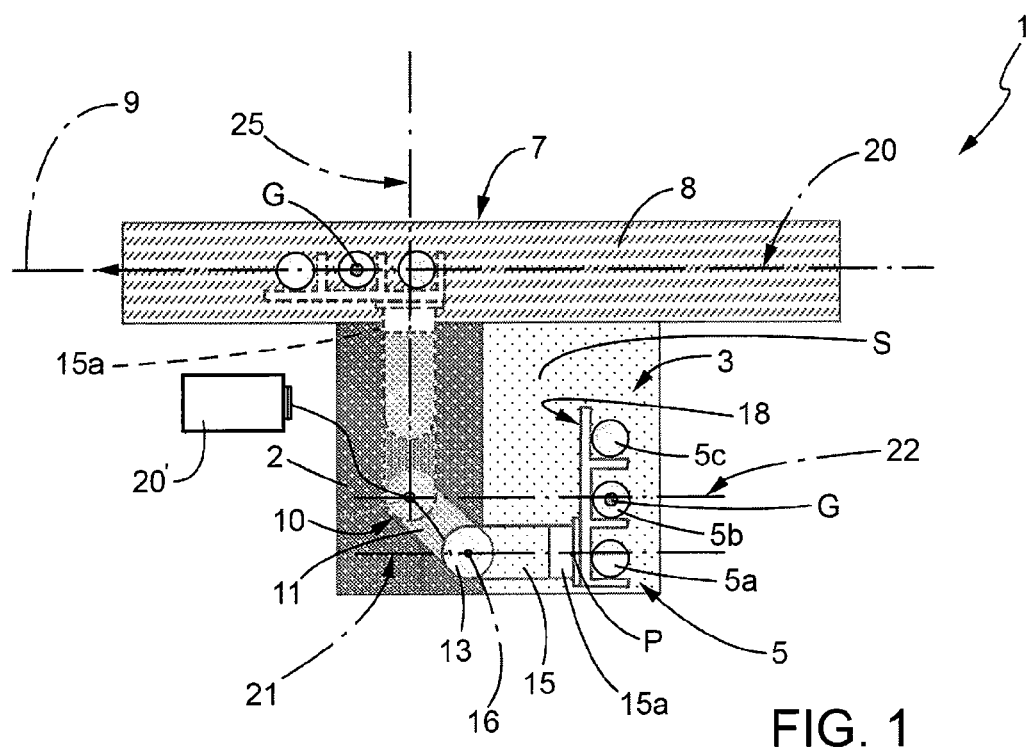
FIG. 1 shows a schematic plan view of a preferred embodiment of the transfer assembly according to the present invention.

Number 1 in FIG. 1 indicates as a whole a transfer assembly for transferring glass articles 5. Assembly 1 comprises a fixed support 2; a horizontal supporting surface 3, known as a dead plate, for supporting a group of articles 5 for transfer—in the example shown, a line of three articles 5a, 5b, 5c; and a carry-off conveyor 7, a conveying branch 8 of which, parallel to supporting surface 3, extends perpendicular to the line of articles 5 to feed articles 5 in a straight horizontal travelling direction 9.

As shown in FIG. 1, assembly 1 also comprises a powered articulated arm 10, in turn comprising an elongated portion 11, one end of which is hinged to fixed support 2 to rotate about a fixed hinge axis 13 perpendicular to supporting surface 3 and to conveying branch 8, and the opposite end of which is hinged to an end portion of a second elongated portion 15.

Second elongated portion 15 is movable with respect to first elongated portion 11 about a movable hinge axis 16 parallel to fixed hinge axis 13, projects from fist elongated portion 11, and has a free end portion 15a connected integrally to a known pusher 18, with aligned seats, not described in detail. Pusher 18 comprises three seats, one for each article 5, in FIG. 1, comprises four seats in the FIG. 4 embodiment, and comprises two seats in a variation not shown.

Figure 2:
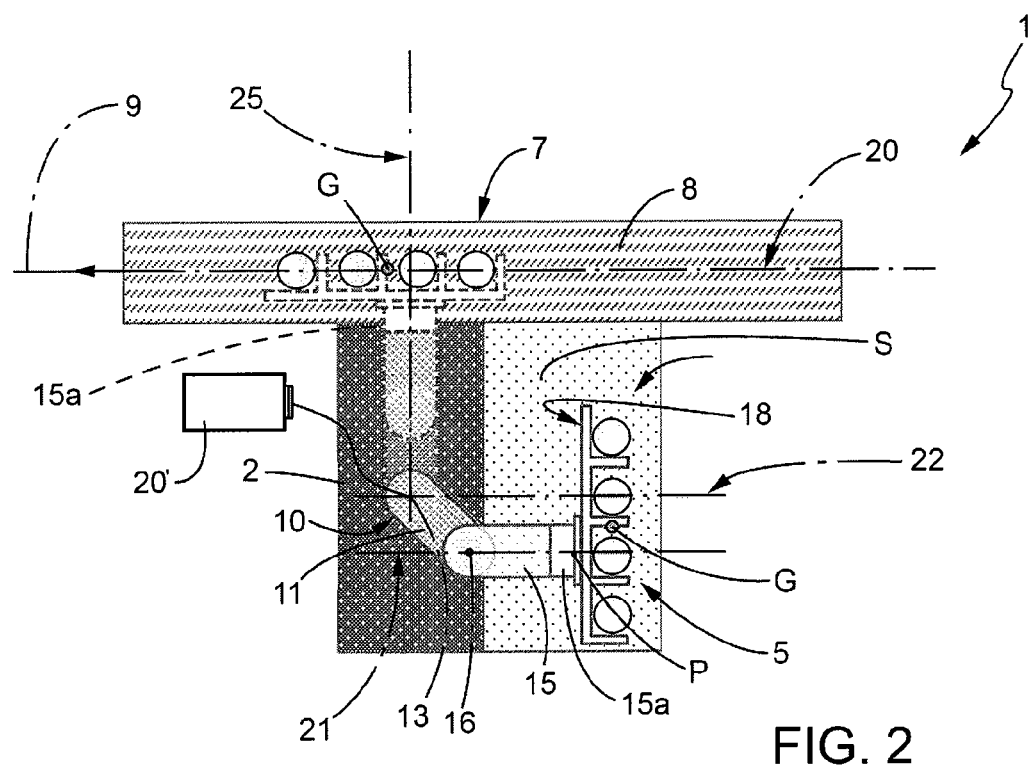
FIG. 2 shows the same view as in FIG. 1, of a variation of a detail in FIG. 1.

Arm 10 is controlled by a control unit 20', also forming part of assembly 1, to move pusher 18 between an engage position (shown by the continuous line in FIGS. 1 and 2) engaging articles 5 on supporting surface 3, and a release position (shown by the dash line in FIGS. 1 and 2) to release articles 5 onto conveying branch 8 of conveyor 7.

Elongated portions 11 and 15 are sized and positioned angularly with respect to each other so that, when pusher 18 is in the engage position, the centre of gravity G of the group of articles 5 engaged by pusher 18 lies in a space S bounded by two parallel planes 20 and 21 (FIGS. 1 and 2) perpendicular to supporting surface 3, and of which plane 20 contains travelling direction 9, and plane 21 extends through end portion 15a of arm 10.

When pusher 18 is in the engage position, movable hinge axis 16 and the point P at which pusher 18 is connected to portion 15a—and which, in the example shown, coincides with the axis of symmetry of elongated portion 15—are located outwards of a further space bounded by plane 20 on one side, and, on the other side, by a further plane 22 parallel to planes 20 and 21 and containing fixed hinge axis 13.

In the release position, on the other hand, pusher 18 projects from portion 15a of arm 10, in the travelling direction of conveying branch 8 of conveyor 7, beyond a plane 25 (FIGS. 1 and 2), containing fixed hinge axis 13 and perpendicular to supporting surface 3 and travelling direction 9, by such an amount that the centre of gravity G of the group of articles 5 is located downstream from plane 25 in the travelling direction of articles 5.

Figure 3:
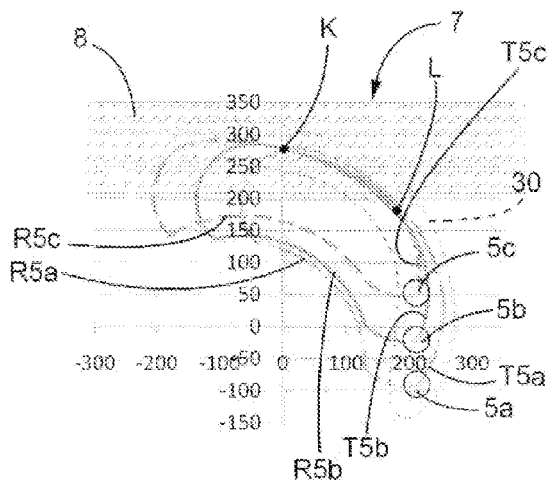
FIGS. 3 and 4 are similar to FIGS. 6 and 7 respectively, and show, respectively, a graph of push trajectories of the articles and return trajectories of the pusher, and a transfer speed graph, using the transfer assembly in FIGS. 1 and 2.

The position of pusher 18 with respect to end portion 15a of arm 10, the resulting locations of centre of gravity G in the engage and release positions, and the configuration of arm 10, with movable hinge axis 16 on the opposite side of fixed hinge axis 13 and plane 22 to conveyor 7, enable articles 5a, 5b, 5c to be removed from supporting surface 3 by moving the centres of gravity of articles 5a, 5b, 5c along predetermined push trajectories indicated T5a, T5b, T5c respectively in FIG. 3, and pusher 18 to be returned to the engage position along return trajectories indicated R5a, R5b, R5c. The way trajectories T5a, T5b, T5c and R5a, R5b, R5c are constructed is described in detail below.

As shown in FIG. 3, trajectories T5a, T5b, T5c have respective substantially superimposed intermediate portions bounded by points K and L, while the other portions are located side by side, substantially facing and parallel.

Figure 6:
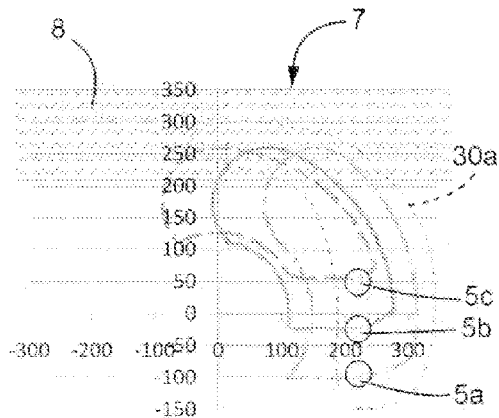
FIG. 6 shows a graph of the push trajectories of the articles and the return trajectories of the pusher using a known transfer assembly.

The advantages of the characteristics of assembly 1 are obvious from a comparison of the FIG. 3 trajectories with those in FIG. 6.

More specifically, as shown in FIG. 3, the push trajectories within the dash line 30 approach conveyor 7 more gradually, and on average in a movement more tangent to conveyor 7, than the known push trajectories within a corresponding dash line 30a in FIG. 6. As a result, just before articles 5 are released onto conveyor 7, the speed and acceleration components perpendicular to conveyor 7 are less than for the known trajectories in FIG. 6. Moreover, because the push trajectories in FIG. 3 are longer than those in FIG. 6, articles 5 are accelerated less than along the corresponding trajectories in FIG. 6, thus resulting in steadier transfer of articles 5, which are all always removed from supporting surface 3, and always released in predetermined positions onto conveyor 7.

Figure 4:
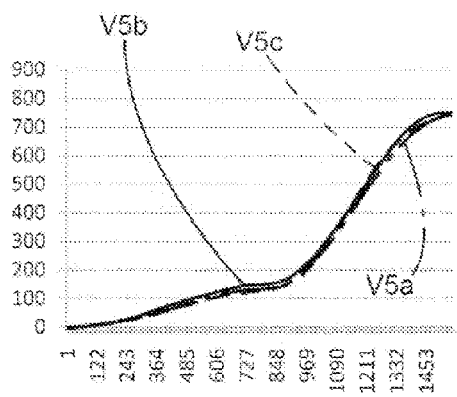
Figure 7:
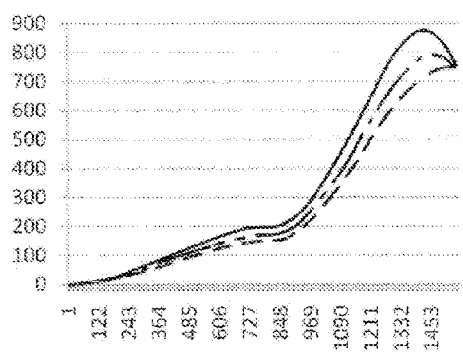
FIG. 7 shows a graph of the speed curves of the transferred articles using a known transfer assembly.

The particular configuration of arm 10 and the position of pusher 18 with respect to arm 10 also provide for a big improvement in the dynamic conditions in which articles 5 are transferred. As shown in FIG. 4, in which V5a, V5b, V5c indicate the speed curves described by the centres of gravity of articles 5a, 5b, 5c at the push stage, the curves are much more similar than the corresponding curves in FIG. 7 relative to transfer using conventional known transfer assemblies. Moreover, the three curves in FIG. 4 increase side by side, and the speed of each article rises gradually up to the speed of conveyor 7, with no noticeable oscillation close to conveyor 7, as occurs in known solutions, as shown in FIG. 7. An oscillation in speed close to conveyor 7 (FIG. 7) produces severe instability, particularly of the article furthest from conveyor 7—in the example shown, article 5a.

In addition to the geometry and/or dimensional characteristics of transfer assembly 1, the above results and advantages are also largely due to the way in which articulated arm 10 and, hence, the movement of pusher 18 are controlled, and, in other words, the way in which the push trajectories of articles 5 and the return trajectories to the engage position are constructed.

More specifically, each trajectory is defined on the basis of a number of parameters, some entered into unit 20 directly by the operator, such as the geometric configuration of the arm, the desired path, the position of the articles for transfer, and the arrival speed at conveyor 7, and others calculated automatically on the basis of output rate and the speed of conveyor 7. The result is a number of passage points and respective motion characteristics; and the passage points are joined using a special interpolation technique based on Hermite curves.

A Hermite curve is defined by the following:

$$P(t) = P_1(2t^3 - 3t^2 + 1) + P_2(-2t^3 + 3t^2) + \frac{dP_1}{dt}(t^3 - 2t^2 + t) + \frac{dP_2}{dt}(t^3 - t^2)$$

Where P1 and P2 are the two end points of the curve, and $$\frac{dP_1}{dt} \text{ and } \frac{dP_2}{dt}$$

represent the prime derivatives at the end points. The curve is a function of parameter t, of dominion $0<=t<=1$, and the intermediate points in the curve are calculated using said equation. In a typical numerical-control application, the intermediate points in the curve must be equally spaced in time; and the intermediate point of each sampling instant must be translated into a value of parameter t, the parameter by which to identify a (normalized) point in the Hermite curve.

Because an increase in uniform space along the curve does not correspond to a uniform increase in parameter t, another equation must be established to relate the two quantities, and which is:

$t=f(S)$

From a desired quantity of space S (measured from the start point of and working along the curve), the value of parameter t corresponding to a point located the desired space from the start point along the Hermite curve can thus be determined:

$Sn \rightarrow f(Sn)) \rightarrow tn$

This, too, is an interpolative function, in which:
the start point P1 of the Hermite curve corresponds to So=0 and to=0;
the end point P2 of the Hermite curve corresponds to Sn=L and tn=1, i.e. space equal to the length L of the whole curve; and
the intermediate points Sn, tn are the passage points of the interpolation function, and the denser they are, the more accurate the interpolation is (the average deviation of the theoretical curve is reduced).

For lack of a closed solution by which to determine it, length L of the curve is calculated numerically.

The above interpolation technique can be used to form one or more portions or the whole of both the push trajectories and the return trajectories to the supporting surface.

Figure 5:
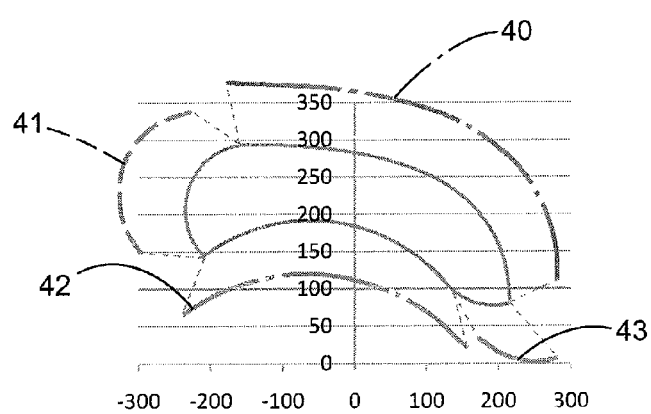
FIG. 5 shows one way of constructing one of the trajectories in FIG. 3.

With reference to FIG. 5, portion 40, corresponding to the entire push trajectory, is preferably formed using the Hermite interpolation technique, whereas portions 41 corresponding to departure from conveyor 7 and braking, portion 42 corresponding to return to the engage position, and portion 43 corresponding to approach to supporting surface 3 are obtained by point-to-point movements, with no trajectory control.

In one variation, the return trajectories are also obtained by joining various segments, all constructed using the Hermite interpolation technique.

In both cases, the push trajectory, or at least part of it, is calculated by Hermite interpolation, taking a reference point coincident with the centre of gravity of an article, e.g. article 5c. For purely geometric reasons, this ensures the other articles 5 travel along trajectories which, at the end, are tangent to and never overstep the centreline of conveyor 7.

The trajectory of article 5c is generated, and the trajectories of the other articles are determined accordingly.

This is made possible by pusher 18 making articles 5b, 5a physically integral with article 5c, which means the positions of articles 5b, 5a can be geometrically determined directly from the positions of article 5c.

The trajectories of the articles differ in length, that of article 5a, again for geometric reasons, being the longest; and, timewise, all the articles start the push movement from supporting surface 3 simultaneously, and complete it simultaneously at conveyor 7. Consequently, applying a given speed curve to the longest trajectory—that of article 5a—produces slower speed curves for the shorter trajectories—those of articles 5b and 5c—thus preventing severe oscillation, as shown in FIG. 7.

Clearly, changes may be made to assembly 1 and the method as described herein without, however, departing from the protective scope defined in the independent Claims. More specifically, arm 10 and pusher 18 may be designed differently from those described and illustrated by way of example.

Also, the curves may be interpolated otherwise than as described, while still achieving the same or equivalent results.

The invention claimed is:

1. A method of transferring a group of glass articles from a supporting surface to a conveyor for carrying the group of glass articles off in a straight horizontal direction, the method comprising:
moving a single articulated arm comprising a first elongated portion hinged to a fixed support to rotate about a fixed hinge axis and a second elongated portion connected to the first elongated portion to rotate about a movable hinge axis parallel to said fixed hinge axis and integrally connected to a pusher for pushing said group of glass articles so as to move the pusher between an engage position engaging the group of glass articles on said supporting surface, and a release position to release the group of glass articles onto said conveyor, said pusher is moved so that, when the pusher is in the release position, the center of gravity of said group of glass articles is located downstream, in a travelling direction of the group of glass articles on the conveyor, from a plane containing the fixed hinge axis and perpendicular to said travelling direction, and said pusher is moved so that, when the pusher is in said engage position engaging the group of glass articles, said center of gravity of the group of glass articles engaged by the pusher lies in a space bounded by two parallel further planes perpendicular to said plane containing the fixed hinge axis, of which one contains said travelling direction, and the other is parallel to the travelling direction and passes through a connection between an end portion of the second elongated portion and the pusher.

2. An assembly as claimed in claim 1, wherein, when the pusher is in said engage position engaging the group of glass articles, the movable hinge axis is on an opposite side of the fixed hinge axis relative to said plane containing the fixed hinge axis.

3. A method of transferring a group of glass articles from a supporting surface to a conveyor for carrying the group of glass articles off in a straight horizontal direction, the method comprising:
rotating an articulated arm, fitted with a pusher for pushing said group of glass articles, about a fixed hinge axis, so as to move the pusher between an engage position engaging the group of glass articles on said supporting surface, and a release position to release the articles onto said conveyor, wherein said pusher is moved so that, when the pusher is in the release position, the center of gravity of said group of articles is located downstream, in the travelling direction of the articles on the conveyor, from a plane containing the fixed hinge axis and perpendicular to said travelling direction, and
wherein each of the articles in the group of glass articles is moved between the engage position and the release position by moving the article along a respective push trajectory; at least an intermediate portion of each said push trajectory being substantially superimposed on a corresponding portion of each of the other push trajectories.

4. A method of transferring a group of glass articles from a supporting surface to a conveyor for carrying the group of glass articles off in a straight horizontal direction, the method comprising:
rotating an articulated arm, fitted with a pusher for pushing said group of glass articles, about a fixed hinge axis, so as to move the pusher between an engage position engaging the group of glass articles on said supporting surface, and a release position to release the articles onto said conveyor, wherein said pusher is moved so that, when the pusher is in the release position, the center of gravity of said group of articles is located downstream, in the travelling direction of the articles on the conveyor, from a plane containing the fixed hinge axis and perpendicular to said travelling direction, and wherein each of the articles in said group of glass articles is moved between said engage position and said release position along a respective push trajectory; at least one portion of said push trajectory being determined by interpolation using the Hermite equation.

5. A method as claimed in claim 4, wherein the whole of the push trajectory is constructed by interpolation using the Hermite equation.

6. A method as claimed in claim 4, wherein said pusher is moved between said release position and said engage position along a return trajectory; at least part of said return trajectory being constructed by interpolation using said Hermite equation.

7. A transfer assembly for transferring glass articles, the assembly comprising:
- a supporting surface for supporting a group of articles to be transferred;
- a conveyor for carrying the group of articles off in a straight horizontal direction;
- a fixed support fixed with respect to said supporting surface;
- a pusher for removing the articles for transfer; and
- a single powered articulated actuating arm to move said pusher between an engage position engaging the group of articles on said supporting surface, and a release position to release the group of articles onto said conveyor, the arm comprising a first elongated portion hinged to said fixed support to rotate about a fixed hinge axis and a second elongated portion rigidly connected to the pusher, and connected to the first elongated portion to rotate about a movable hinge axis parallel to said fixed hinge axis, when the pusher is in said engage position engaging the group of articles, said center of gravity of the group of articles engaged by the pusher lies in a space bounded by two parallel further planes perpendicular to a plane containing the fixed hinge axis, one of which contains said travelling direction, and the other is parallel to the travelling direction and passes through a connection between an end portion of the second elongated portion and the pusher.

8. An assembly as claimed in claim 7, wherein the pusher is connected to said arm at a point which, when the pusher is in said engage position, extends outside a space bounded by two planes perpendicular to said plane containing the fixed hinge axis, and respectively containing said fixed hinge axis and said travelling direction.

9. An assembly as claimed in claim 7, wherein when the pusher is in said release position, said first and second elongated portions are aligned along said plane containing the fixed hinge axis.

10. An assembly as claimed in claim 7, wherein, when the pusher is in said engage position engaging the group of articles, the movable hinge axis is on an opposite side of the fixed hinge axis relative to said plane containing the fixed hinge axis.

* * * * *